United States Patent
Rai (10) Patent No.: US 8,059,292 B2
(45) Date of Patent: Nov. 15, 2011

(54) SYSTEM AND METHOD FOR ASSIGNING PRINT JOBS TO AUTONOMOUS CELLS IN A TRANSACTION PRINTING ENVIRONMENT

(75) Inventor: Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1164 days.

(21) Appl. No.: 11/750,818

(22) Filed: May 18, 2007

(65) Prior Publication Data
US 2008/0285068 A1   Nov. 20, 2008

(51) Int. Cl.
*G06K 15/00* (2006.01)
*G06F 3/12* (2006.01)
*G06F 9/46* (2006.01)

(52) U.S. Cl. ............ 358/1.15; 358/1.13; 358/1.14; 718/101; 718/102; 718/103; 718/104; 718/105

(58) Field of Classification Search .......... None
See application file for complete search history.

(56) References Cited

U.S. PATENT DOCUMENTS

| | | | |
|---|---|---|---|
| 6,805,502 B2 | 10/2004 | Rai et al. | |
| 7,051,328 B2 | 5/2006 | Rai et al. | |
| 7,064,848 B2 | 6/2006 | Jackson et al. | |
| 7,079,266 B1 | 7/2006 | Rai et al. | |
| 2003/0121431 A1* | 7/2003 | Ohno | 101/128.4 |
| 2004/0136025 A1* | 7/2004 | Moriyama et al. | 358/1.14 |
| 2005/0065830 A1 | 3/2005 | Duke et al. | |
| 2007/0236724 A1* | 10/2007 | Rai et al. | 358/1.15 |
| 2008/0013109 A1* | 1/2008 | Chen et al. | 358/1.1 |

* cited by examiner

*Primary Examiner* — Benny Tieu
*Assistant Examiner* — Haris Sabah
(74) *Attorney, Agent, or Firm* — Pepper Hamilton LLP (57) ABSTRACT

Methods and systems for assigning a plurality of print jobs in a transaction printing environment are disclosed. A print job workflow management system receives a plurality of print jobs each having a job size and selects a first threshold based on at least the job sizes for the plurality of print jobs. A print job is assigned to a first autonomous cell if the job size for the print job is greater than the first threshold. The print job is assigned to a second autonomous cell if the job size for the print job is less than a second threshold. Otherwise, the print job is assigned to a third autonomous cell.

20 Claims, 6 Drawing Sheets

SYSTEM AND METHOD FOR ASSIGNING PRINT JOBS TO AUTONOMOUS CELLS IN A TRANSACTION PRINTING ENVIRONMENT

BACKGROUND

1. Technical Field

The present disclosure generally relates to printing systems and methods, and especially methods and systems for improving the performance of workflow in a production environment, such as a transaction printing environment. More particularly, the present disclosure relates to systems and methods for jointly assigning structural parameters and scheduling parameters to a workflow, such as a print job, in order to improve the performance of the workflow production environment.

2. Background

A transaction printing environment is typically a high-volume document production entity that produces documents associated with financial transactions such as checks, invoices, statements and the like from a data stream for businesses. Typically, the data printed on each document (or set of documents) in a transaction printing environment varies significantly. For example, the data on a first document might pertain to a first credit card user for a credit institution, while the data on a second document might pertain to a second credit card user for the credit institution. This is in contrast to a printing environment, such as for book printing, where several identical documents are produced and finished consecutively.

Typically, transaction printing environments are organized into departments. For example, a transaction printing environment could include a data processing department (including computers and associated peripherals) for processing data and creating production jobs; a printing department including continuous feed printers and/or cut-sheet printers; an inserting department including a variety of inserters, such as check inserters, multiple tower inserters and flat inserters; a rework and/or hand-inserting department to sort mail pieces eligible for postal discounts; a shipping department for mailing completed documents; and a warehouse department that stores and replenishes forms, paper and the like. The warehouse department may also prepare and deliver paper, rolls, inserts and/or other materials to the production floor. Additional support departments may include a technical services department, a customer service department and the like.

Figure 1:
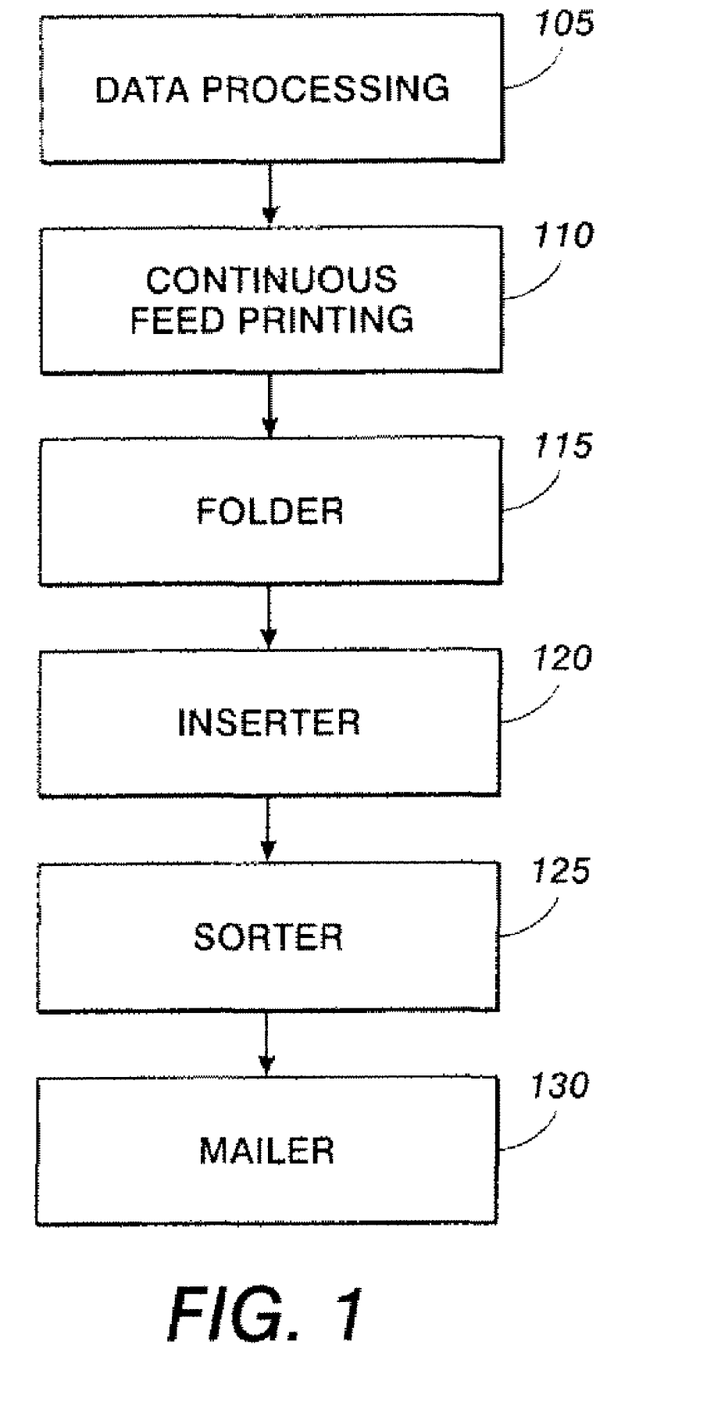
FIG. 1 depicts a transaction print workflow according to the known art.

A conventional transaction print workflow is depicted in FIG. 1. As shown in FIG. 1, incoming data pertaining to a job is processed 105 to determine the operations to be performed. The data is then printed 110 using, for example, a continuous feed printer. A continuous feed printer includes a roll of paper including pre-printed forms. As such, paper is continuously fed into the printer resulting in high speed printing. In a typical transaction print operation, data corresponding to a plurality of recipients is printed 110 on the forms.

One or more of folding 115, inserting 100 and sorting 125 operations can be performed based on the requirements of the transaction print job. For a folding operation 115, each printed form can be folded according to the transaction print job requirements. Ancillary documents can be inserted 120 into the print job. For example an advertisement for a service provided by a bank might be inserted into a bank statement print job, A sorting operation 125 could be used to sort the documents into individual document groups for each recipient. Each document group can then be mailed 130 to the appropriate recipient.

Job types in a transaction printing environment typically include one of the following, production flows:

Simplex Print→(Hand/Machine) Insert→Sort→Mail
Duplex Print→(Hand/Machine) Insert→Sort→Mail
Micr-Duplex Print→(Hand/Machine) Insert→Sort→Mail While print volume (number of forms printed) often varies substantially between print jobs, all jobs typically go through approximately the same production work flow. However, very small jobs, such as jobs requiring less than 100 forms, would likely be printed on a cut-sheet desktop printer and hand-inserted because the time to perform the set up for such jobs on large continuous feed printers and inserters would not be economical.

Methods exist for improving the operation of a traditional transaction printing environment. One method involves re-conceptualizing a traditional transaction printing environment as a type of factory process. In such a method, the transaction printing environment is considered to be synonymous with a factory plant, and each print job is considered to be synonymous with a manufactured product. In this manner, commonly known factory flow processes can be adapted to the transaction printing environment and used to improve the flow of print jobs through the transaction printing environment.

In accordance with another method, a transaction printing environment may be reorganized into autonomous cells as disclosed in U.S. Pat. No. 7,079,266 to Rai et al., the disclosure of which is incorporated herein in its entirety. An autonomous cell is a group of resources used to process jobs of at least one type. A resource is a device configured to process at least a portion of one or more jobs. In a transaction printing environment, a resource can include a printer, a copier, a binder, a hole-punch, a collator, a scaler, an inserter or other equipment used to perform an operation on a document. Autonomous cells group equipment ova together according to different job types commonly encountered within a specific transaction printing environment. The jobs can then be sub-divided into smaller sub-jobs and processed through the autonomous cells.

Another method to improve operation is to cross-train operators on multiple pieces of equipment. Operators can then be allocated more flexibly as needed throughout the shop. Opportunities also exist to improve scheduling of jobs so as to reduce the amount of inventory and to more fully utilize equipment.

An additional option is to improve the layout of equipment in the transaction printing environment in order to decrease the amount of excess movement required within the environment. These methods have been shown to reduce the cost of operating all classes of transaction printing environments by up to twenty percent within six months of initial implementation.

Although such methods for operational improvement exist, print shop owners are understandably slow to change their methods of operations. The resistance of print shop owners to change might occur because implementing such change can be quite invasive. For example, implementing operational improvements can require retraining operators, moving heavy equipment, and learning new processes, each of which equates to down time and lost productivity for the shop during transition. This lost productivity is problematic for a shop owner who must keep the shop operating smoothly throughout a transition period. As such, a print shop owner has little incentive to make operational changes without having quantitative data showing a positive benefit to bottom-line profits.

It is therefore problematic that print shop owners typically have insufficient data to quantify the extent of possible gains available to them by implementing, improved operational methods.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "job" is a reference to one or more jobs and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a method for assigning a plurality of print jobs in a transaction printing environment among one or more autonomous cells capable of completely processing a print job may include receiving, by a print job workflow management system, a plurality of print jobs each having a job size selecting, by the print job workflow, management system, a first threshold based on at least the job sizes for the plurality of print jobs, and, for each print job, assigning the print job to a first autonomous cell to process the print job if the job size for the print job is greater than the first threshold, assigning the print job to a second autonomous cell to process the print job if the job size for the print job is less than a second threshold and assigning the print job to a third autonomous cell to process the print job otherwise.

In an embodiment, a system for processing a plurality of print jobs in a transaction printing environment may include a plurality of autonomous cells and a print job workflow management system that coordinates a flow of print jobs with respect to said plurality of autonomous cells. Each autonomous cell is configured to process print jobs. The print job workflow management system is configured to receive a plurality of print jobs each having a job size, select a first threshold based on at least the job sizes for the plurality of print jobs, and, for each print job, assign an autonomous cell to process the print job. The print job workflow management system may assign a first autonomous cell is assigned if the job size for the print job is greater than the first threshold, a second autonomous cell is assigned if the job size for the print job is less than a second threshold, and a third autonomous cell otherwise.

BRIEF DESCRIPTION OF THE DRAWINGS

Aspects, features, benefits and advantages of the present invention will be apparent with regard to the following description and accompanying drawings, of which.

DETAILED DESCRIPTION

For purposes of the discussion below, a "transaction printing environment" is a high-volume document production entity that produces documents associated with financial transactions such as checks, invoices, statements and the like from a data stream for businesses. The transaction printing environment may be a freestanding entity, including one or more print-related devices, or it may be pail of a corporation or other entity. Additionally, the transaction printing environment may communicate with one or more servers by way of a local area network (LAN) or a wide area network (WAN), such as the Internet, the World Wide Web or the like.

The term "device" refers to a machine used to perform an operation. Exemplary devices include printers, cutters, collators, inserters and the like.

A "job" refers to a logical unit of work that is to be completed for a customer. For example, a job may include one or more instructions and one or more parameters that, when processed, result in an output. In a transaction printing environment, a job may include one or more print jobs from one or more clients. A production system may include a plurality of jobs.

A "print jobs" refers to a job that is processed in a document production system, such as a transaction printing environment. For example, a print job may include one or more instructions and one or more parameters that when processed, result in credit card statements corresponding to a certain credit card company, bank statements corresponding to a certain bank, a printed document or the like.

Figure 2:
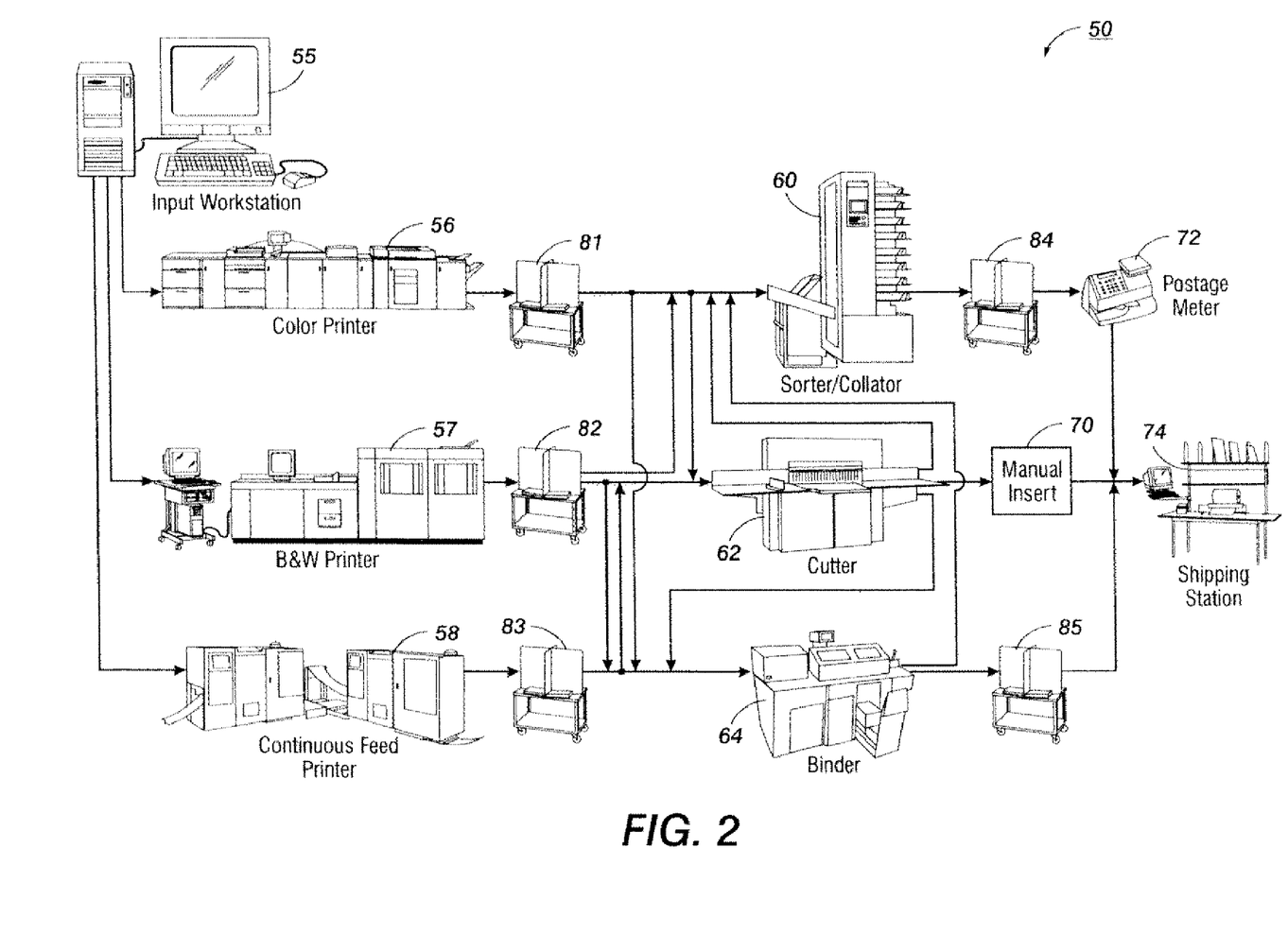
FIG. 2 depicts a block diagram for exemplary transaction printing environment components.

FIG. 2 shows an example of a production environment 50, in this case, exemplary elements of a transaction printing environment. Print jobs may enter the transaction printing environment manually or electronically and be collected at an electronic submission system 55 such as a computing device and/or scanner. Print jobs are sorted and batched at the submission system or another location before being delivered to one or more print engines such as a color printer 56, black-and-white printer 57 and/or a continuous feed printer 58. Printed documents may exit the print engine and be delivered to one or more finishing devices or areas such as a collator 60, cutter 62 and/or binder 64. The finishing areas may include automatic or manual areas for such finishing activities, and they also may include an automatic or manual inserter 70. Finally, the documents may move to a postage metering station 72 and/or shipping station 74. Documents for jobs may move from one location to another in the transaction printing environment by automatic delivery or manual delivery such as by hand or by one or more paper carts 81-85.

Different elements of a production environment may require setup time in order to prepare the device to process a particular job. For example, some print jobs use pre-printed forms, such as bank statements that are pre-printed with the bank's logo and contact information or credit card statements pre-printed with charge dispute procedures. Forms also may include inserts such as marketing materials or subscription cards. If a device in a transaction printing environment receives two consecutive print jobs that use identical forms, little or no changeover is required between the two print jobs. However, if the forms are different, the print jobs have different setup characteristics, and a significant setup time may be required to load the new form into the machine. This is especially noticeable in continuous feed printing devices 58, where it can take up to 15 minutes or more to load a new form roll.

Simulating the operation of production environments and/or retrieving statistical information from the operation of production environments may enable such environments to be optimized. A workflow management system may receive information pertaining to a plurality of jobs processed by a production environment, such as a transaction printing environment. In an embodiment, the information may be received as a data stream from the customer and stored in a database that is subsequently processed by a software program to create printable documents. In an embodiment, a customer may provide a print shop with document files (e.g., PDF or postscript files) that can be directly routed for printing.

Exemplary information received by the workflow management system may include a plurality of job characteristics for each job. Exemplary job characteristics for a transaction printing environment may include, without limitation, a job identifier, a job arrival time, a job due time, a form type, a form count, a form width, a form length, an envelope count, a print class, an insert process type, an insert group type, an insert time, a print time, an insert setup time and/or a print setup time. Additional and/or alternate job characteristics or other information may be received by a workflow management system based on this disclosure.

A job identifier is an alphanumeric value that uniquely identifies a job. A job arrival time is a date and/or time at which a job arrives at the production environment. A job due time is a date and/or time that a job is due for delivery from the production environment.

A form type is an identifier that uniquely identifies a type of form on which a document is printed for a job. A form count is a number of forms required to process a job. A form width is a width of a form on which a document is printed for a job. A form length is a length of a form on which a document is printed for a job. In an embodiment, the form width and form length characteristics may not be explicitly provided, but may be inherent based on, for example, the form type.

An envelope count is a number of envelopes to be produced for a job that includes items to be mailed. A print class is a type of printing that is performed for a job. Exemplary print classes may include, without limitation, simplex printing (one-sided printing), duplex printing (two-sided printing), micr-simplex printing and micr-duplex printing.

An insert process type is an identifier that uniquely identifies whether a job includes machine insertion or hand insertion. An insert group type is an alphanumeric identifier that identifies a set of inserts for the job. An insert time is the total time required to perform insertion operations for a job. An insert setup time is the total time required to setup an inserter that performed insertion operations for a job.

A print time is the total time required to perform printing operations for a job. A print setup time is the total time required to setup a printer that performed printing operations for a job.

An exemplary set of job characteristics is shown in Table 1.

TABLE 1

| Job ID | Arrival | Due | Form Type | Form Count | Form Width | Form Length | Total Count | Class | Insert Process Type | Insert Group Type | Insert Time | Print Time |
|---|---|---|---|---|---|---|---|---|---|---|---|---|
| 1 | 3/1/07 12:00 AM | 3/3/07 4:00 PM | 1 | 1623 | 15 | 11 | 1612 | Duplex | 1 | 15 | 1.06 | 0.4058 |
| 2 | 3/1/07 12:00 AM | 3/3/07 4:00 PM | 2 | 52 | 15 | 14 | 52 | Duplex | 0 | 7 | 0.87 | 0.0130 |
| 3 | 3/1/07 12:00 AM | 3/2/07 4:00 PM | 2 | 11 | 15 | 14 | 11 | Duplex | 0 | 7 | 0.18 | 0.0028 |
| 4 | 3/1/07 12:00 AM | 3/2/07 4:00 PM | 3 | 63 | 15 | 11 | 33 | Micr Duplex | 0 | 4 | 0.55 | 0.0158 |
| 5 | 3/1/07 12:00 AM | 3/2/07 4:00 PM | 4 | 1 | 15 | 14 | 1 | Duplex | 0 | 8 | 0.02 | 0.0003 |
| 6 | 3/1/07 12:00 AM | 3/2/07 4:00 PM | 4 | 41 | 15 | 14 | 41 | Duplex | 0 | 44 | 0.68 | 0.0103 |
| 7 | 3/1/07 12:00 AM | 3/3/07 4:00 PM | 5 | 5 | 18 | 11 | 5 | Duplex | 0 | 3 | 0.08 | 0.0013 |
| 8 | 3/1/07 12:00 AM | 3/1/07 4:00 PM | 6 | 32 | 18 | 14 | 28 | Duplex | 0 | 14 | 0.47 | 0.0080 |
| 9 | 3/1/07 12:00 AM | 3/3/07 4:00 PM | 7 | 2640 | 15 | 14 | 2533 | Duplex | 1 | 1 | 1.60 | 0.6600 |
| 10 | 3/1/07 12:00 AM | 3/1/07 4:00 PM | 8 | 4 | 15 | 11 | 4 | Duplex | 0 | 632 | 0.07 | 0.0010 |
| 11 | 3/1/07 12:00 AM | 3/1/07 4:00 PM | 9 | 28310 | 18 | 11 | 18990 | Duplex | 1 | 77 | 7.23 | 7.0775 |
| 12 | 3/1/07 12:00 AM | 3/2/07 4:00 PM | 9 | 217 | 18 | 11 | 118 | Duplex | 1 | 84 | 0.09 | 0.0543 |
| 13 | 3/1/07 12:00 AM | 3/4/07 4:00 PM | 9 | 193 | 18 | 11 | 151 | Duplex | 1 | 77 | 0.68 | 0.0483 |
| 14 | 3/1/07 12:00 AM | 3/4/07 4:00 PM | 9 | 82 | 18 | 11 | 82 | Duplex | 1 | 77 | 0.49 | 0.0205 |

TABLE 1-continued

| Job ID | Arrival | Due | Form Type | Form Count | Form Width | Form Length | Total Count | Class | Insert Process Type | Insert Group Type | Insert Time | Print Time |
|---|---|---|---|---|---|---|---|---|---|---|---|---|
| 15 | 3/1/07 12:00 AM | 3/3/07 4:00 PM | 9 | 40 | 18 | 11 | 17 | Duplex | 0 | 83 | 0.28 | 0.0100 |
| 16 | 3/1/07 12:00 AM | 3/3/07 4:00 PM | 9 | 35 | 18 | 11 | 7 | Duplex | 0 | 83 | 0.12 | 0.0088 |
| 17 | 3/1/07 12:00 AM | 3/4/07 4:00 PM | 9 | 56 | 18 | 11 | 7 | Duplex | 0 | 83 | 0.12 | 0.0140 |
| 18 | 3/1/07 12:00 AM | 3/4/07 4:00 PM | 9 | 18 | 18 | 11 | 6 | Duplex | 0 | 83 | 0.10 | 0.0045 |
| 19 | 3/1/07 12:00 AM | 3/3/07 4:00 PM | 9 | 3 | 18 | 11 | 1 | Duplex | 0 | 84 | 0.02 | 0.0008 |

As stated above, in a transaction printing environment, very small print jobs may be processed using a cut-sheet desktop printer and hand-inserted in order to avoid extensive setup times associated with continuous feed printers and inserters. However, print jobs may be further separated into an additional category (referred to herein as mid-sized jobs) and processed in a different autonomous cell based on job size. In addition a formal optimization approach that determines at least one threshold for the mid-sized print jobs and the production cell capacity is described.

Figure 3:
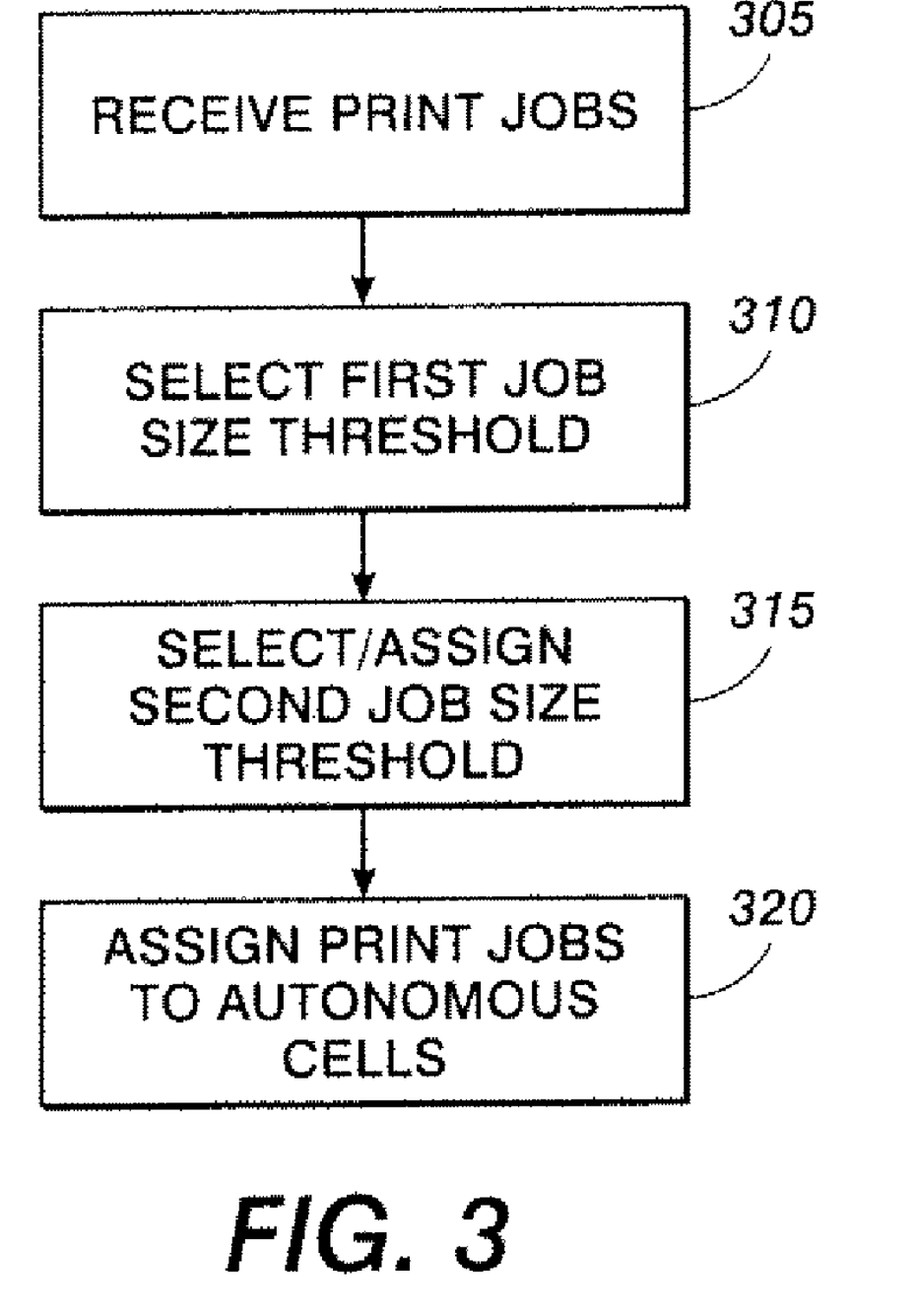
FIG. 3 depicts a graph of an exemplary job size distribution for print jobs in a production environment according to an embodiment.

FIG. 3 depicts a flow diagram of an exemplary method of performing jobs in a production environment according to an embodiment. As shove in FIG. 3, a plurality of print jobs may be received 305 by a print job workflow management system. Each print job may have an associated job size corresponding to the number of forms required to be produced for the print job. The job sizes for the print jobs may be used to generate a job size distribution. In an embodiment, the job size distribution may be a representative job size distribution for the environment based on, for example, historical print job size data. In an embodiment, the job size distribution may be dynamically updated as new print jobs are received.

A first threshold may be selected 310 based on at least the job size associated with each of the plurality of print jobs. In an embodiment, a second threshold may also be selected 315 based on at least the job size associated with each of the plurality of print jobs. In an alternate embodiment, the second threshold may be assigned a value by, for example, a human operator, such as a print shop owner or worker.

Print jobs having an associated job size larger than the first threshold are referred to herein as "large jobs." Print jobs having an associated job size less than the second threshold are referred to herein as "small jobs," Print jobs having an associated job size that is neither greater than the first threshold nor less than the second threshold are referred to herein as "mid-sized jobs."

The first threshold for a transaction printing environment may be selected 310 by determining a maximum device utilization at which a percentage of print jobs that are processed by an autonomous cell associated with mid-sized jobs and are completed late (e.g., after the time for the print job) is less than a predefined maximum late job value. The maximum device utilization may be determined by simulating the ability of the autonomous cell associated with mid-sized jobs to perform print jobs having job sizes between the second threshold and one or more potential values for the first threshold in a timely manner. In an embodiment, the predefined maximum late job value may be approximately 0 (i.e., no late jobs).

In an embodiment, a value for the first threshold may be selected 310 that substantially maximizes a throughput (i.e., sheet volume) for the autonomous cell assigned to mid-sized jobs and for which the maximum device utilization for such autonomous cell is greater than a predefined minimum device utilization value. In an embodiment, the predefined minimum device utilization value may be approximately 50%.

Each print job may then be assigned 320 to an autonomous cell based on its job size. For example, a print job may be assigned 320 to a first autonomous cell if the print job is greater than the first threshold, to a second autonomous cell if the print job is less than the second threshold and to a third autonomous cell otherwise. In an embodiment, the first autonomous cell may include a continuous feed printer and an automatic inserter, the second autonomous cell may include a desktop printer and no inserter (i.e., insertion is performed manually), and the third autonomous cell may include a cut-sheet printer and an automatic inserter.

In an embodiment, the first and/or second thresholds may be updated substantially in real time. In an embodiment, a print job workflow management system may update a job size distribution as each print job is received. The first threshold (and optionally the second threshold) may be automatically determined based on the updated job size distribution. In an embodiment, the print job workflow management system may use the job sizes for all print jobs arriving within a particular time period to determine the first threshold and/or the second threshold. In an embodiment, job size information from less than all incoming print jobs may be selected such as by selecting job size information from random print jobs, a percentage of incoming print jobs or the like.

EXAMPLE

Figure 4:
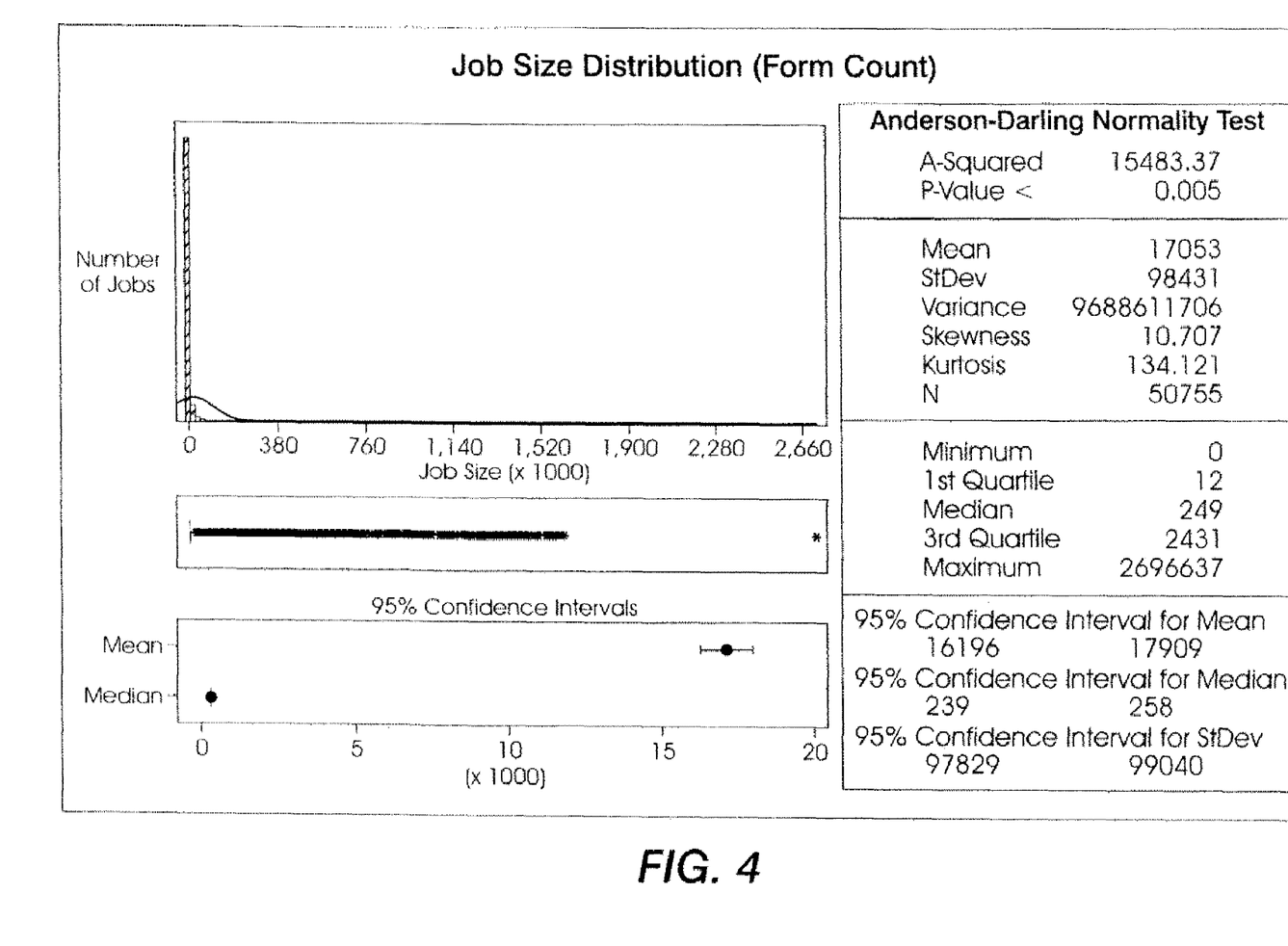
FIG. 4 depicts a flow diagram of an exemplary method of performing jobs in a production environment according to an embodiment.

FIG. 4 depicts a graph of an exemplary job size distribution for print jobs in a transaction printing environment. The job size distribution defines an ordered grouping of a plurality of print jobs based on the corresponding job sizes. The job size distribution includes statistical information pertaining to job sizes, such as a mean job size, a median job size, a standard deviation for job sizes a coefficient of variation for the job sizes and/or the like. Based on the job size distribution for the exemplary transaction printing environment, efficiency improvements may be implemented that determine a job category for each print job and improve autonomous cell utilization.

In this example, the second threshold (i.e., the threshold for small jobs) is set to a known value. Based on typical job size distributions and the high variability of print job sizes, the number of print jobs that are mid-sized jobs is large, but the sheet volume associated with such print jobs is small. For example, if the first threshold is set to 6000 Forms, approximately 85% of the print jobs in the present example are less than the threshold. However, such print jobs only comprise approximately 3% of the total sheet volume. As such, removing the mid-sized jobs from the print jobs assigned to autonomous cells containing continuous feed printers and diverting them to cut-sheet printers may streamline production (due to reduced setup issues) and increase efficiency for the large jobs.

Figure 5:
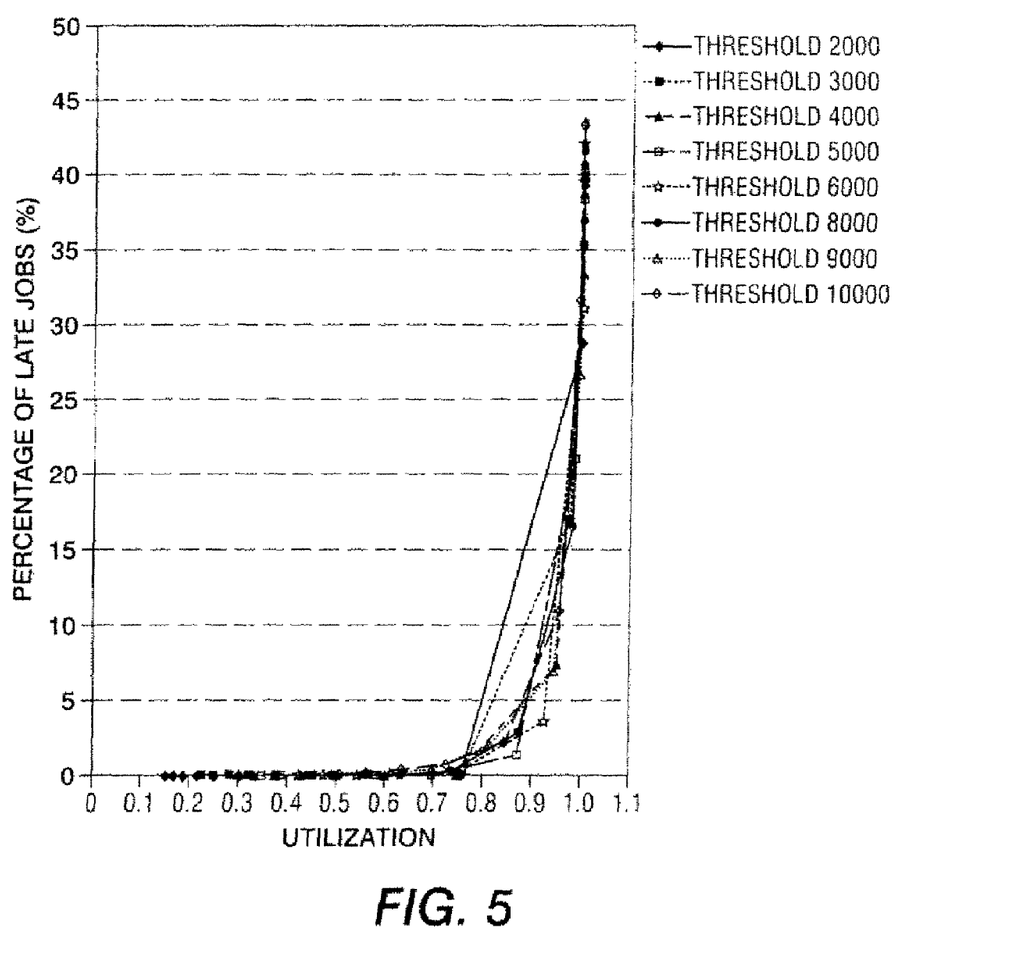
FIG. 5 depicts a graph of job lateness vs. device utilization for a plurality of potential first threshold values based on the exempla job size distribution of FIG. 4.

In the example, no late print jobs are tolerated because stiff penalties can result for print shop owners for failure to meet due date deadlines in a transaction printing environment. FIG. 5 depicts a graph of job lateness vs. cut-sheet device utilization for a plurality of potential first threshold values based on the exemplary job size distribution of FIG. 4 and cut-sheet printers having a known print speed. As the first threshold increases (i.e., as print jobs having larger sizes are routed to the cut-sheet printers), the loading increases and the utilization level above which some print jobs are processed late drops. For example, if the first threshold is set to 2000 forms, some print jobs are processed late only when device utilization exceeds 75%. In contrast, if the first threshold is set to 10000 forms, some print jobs are processed late when device utilization exceeds 40%.

Figure 6:
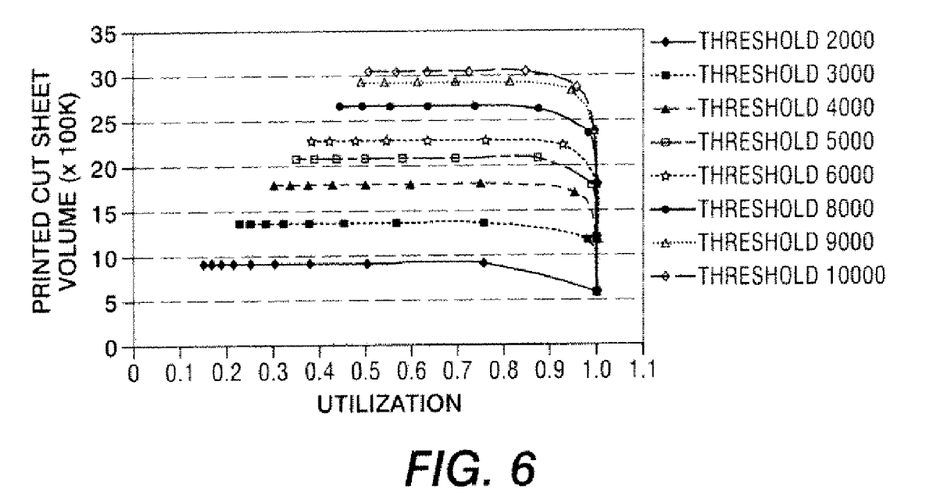
FIG. 6 depicts a graph of the sheet volume handled by the mid-sized job autonomous cell in a timely fashion vs. device utilization at a plurality of first threshold values based on the exemplary job size distribution of FIG. 4.

In addition, the herein described example attempts to maximize cut-sheet volume for the autonomous cell handling mid-sized jobs in order to reduce the burden on the continuous feed printers assigned to the large jobs. FIG. 6 depicts a graph of the sheet volume handled by the mid-sized job autonomous cell in a timely fashion vs. the device utilization at a plurality of first threshold values based on the exemplary job size distribution of FIG. 4. As shown in FIG. 6, the sheet volume for timely completed print jobs decreases as the device utilization increases for each value of the first threshold.

Figure 7:
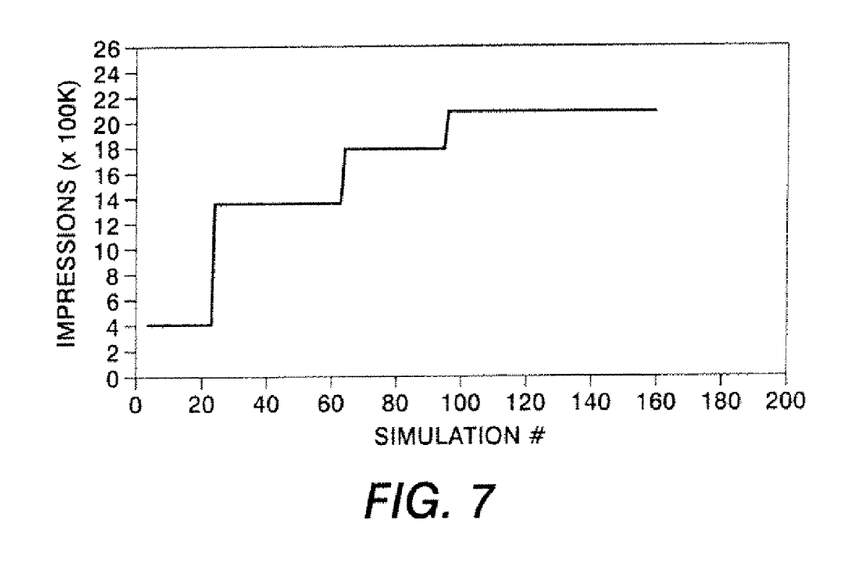
FIG. 7 depicts a graph representing the output of an optimization program determining the number of sheet impressions handled by the mid-sized job autonomous cell for the job size distribution depicted in FIG. 4.

As such, an optimal combination for the first threshold and device utilization may be determined that maximizes sheet volume for the autonomous cell handling mid-sized jobs. FIG. 7 depicts the results of performing such an optimization for the job size distribution depicted in FIG. 4. The graph in FIG. 7 depicts iterative results from determining an objective function seeking to maximize the sheet volume for mid-sized jobs. Two variables, the value of the first threshold and printer speed for printers in the mid-sized job autonomous cell, are simultaneously determined that maximize the objective function with two constraints, the device utilization must exceed a device utilization threshold value (in this case, 50%) and all print jobs must be timely completed. These constraints represent one acceptable configuration for a mid-sized job autonomous cell. Alternate device utilization threshold values and/or an acceptable percentage of late jobs may be used instead. In addition, the objective function may include additional and/or alternate variables, such as the number of operators, the number of printers in the cell (potentially including printer speeds for each printer) and the like.

As shown in FIG. 7 and Table 2 below the sheet volume for mid-sized jobs based on the job size distribution shown in FIG. 4 may be approximately 2.09 million impressions, which is approximately 3.4% of the total sheet volume for the job size distribution of FIG. 4.

TABLE 2

| | Parameters | Value |
| --- | --- | --- |
| Optimal Value of Design Variables | Cut Sheet Printer Speed | 6000 |
| | First Threshold | 5000 |
| Output Response at the | Total Cut Sheet Impressions | 2090494 |

TABLE 2-continued

| | Parameters | Value |
| --- | --- | --- |
| Optimized Point | % Late Jobs | 0 |
| | Cut Sheet Printer Utilization | 58% |

It will be appreciated that various of the above-disclosed and other features ad functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A method for assigning a plurality of print jobs in a transaction printing environment among a plurality of autonomous cells including a first autonomous cell, a second autonomous cell and a third autonomous cell, capable of completely processing a print job, the method comprising:
  receiving, by a print job workflow management system, a plurality of print jobs, wherein each print job has a job size;
  selecting, by the print job workflow management system, a first threshold value based on at least the job sizes for the plurality of print jobs by determining a maximum device utilization for the third autonomous cell at which a percentage of print jobs processed late is less than a predefined maximum late job value, wherein the first threshold value maximizes a sheet volume for the third autonomous cell and wherein the maximum device utilization the third autonomous cell based on the first threshold value is greater than a predefined minimum device utilization value; and
  for each print job:
    if the job size for the print job is greater than the first threshold value, assigning the first autonomous cell to process the print job,
    if the job size for the print job is less than a second threshold value, assigning the second autonomous cell to process the print job, and
    otherwise, assigning the third autonomous cell to process the print job;
  wherein the first threshold value is greater than the second threshold value.

2. The method of claim 1 wherein assigning a first autonomous cell comprises assigning a continuous feed printer to process the print job.

3. The method of claim 1 wherein assigning a second autonomous cell comprises assigning a desktop printer to process the print job.

4. The method of claim 1 wherein assigning a third autonomous cell comprises assigning a cut-sheet printer to process the print job.

5. The method of claim 1 wherein:
  the predefined maximum late job value is approximately zero; and
  the predefined minimum device utilization value is approximately 50%.

6. The method of claim 1, further comprising:
  selecting the second threshold value based on at least the job sizes for the plurality of jobs.

7. The method of claim 1 wherein selecting the first threshold value comprises dynamically updating the first threshold value substantially in real time.

8. A system for assigning a plurality of print jobs in a transaction printing environment, the system comprising:
- a plurality of autonomous cells including a first autonomous cell, a second autonomous cell and a third autonomous cell, and wherein each of the plurality of autonomous cells is configured to process print job; and
- a print job workflow management system that coordinates a flow of print jobs with respect to said plurality of autonomous cells, wherein the print job workflow management system is configured to:
  - receive a plurality of print jobs, wherein each print job has a job size;
  - select a first threshold value based on at least the job sizes for the plurality of print jobs by determining a maximum device utilization for the third autonomous cell at which a percentage of print jobs processed late is less than a predefined maximum late job value, wherein the first threshold value maximizes a sheet volume for the third autonomous cell and wherein the maximum device utilization of the third autonomous cell based on the first threshold value is greater than a predefined minimum device utilization value; and
  - for each print job, assign an autonomous cells to process the print job, wherein the first autonomous cell is assigned if the job size for the print job is greater than the first threshold value, wherein the second autonomous is assigned if the job size for the print job is less than a second threshold value, wherein the third autonomous cell is otherwise assigned,
  - wherein the first threshold value is greater than the second threshold value.

9. The system of claim 8 wherein the first autonomous cell comprises a continuous feed printer.

10. The system of claim 8 wherein the second autonomous cell comprises a desktop printer.

11. The system of claim 8 wherein the third autonomous cell comprises a cut sheet printer.

12. The system of claim 8 wherein:
- the predefined maximum late job value is approximately zero; and
- the predefined minimum device utilization value is approximately 50%.

13. The system of claim 8 wherein the print job workflow management system is further configured to select the second threshold value based on at least the job sizes for the plurality of print jobs.

14. The system of claim 8 wherein the print job workflow management system is configured to select a first threshold value by dynamically updating the first threshold value substantially in real time.

15. A method for assigning a plurality of print jobs in a transaction printing environment among a plurality of autonomous cells including a first autonomous cell, a second autonomous cell and a third autonomous cell, capable of completely processing a print job, the method comprising:
- receiving, by a print job workflow management system, a plurality of print jobs, wherein each print job has a job size;
- selecting, by the print job workflow management system, a first threshold value based on at least the job sizes for the plurality of print jobs by simultaneously determining the first threshold value and a printer speed for the third autonomous cell by maximizing an objective function having at least a first constraint and a second constraint, wherein the first constraint comprises a maximum percentage of late jobs, wherein the second constraint comprises a minimum device utilization value; and
- for each print job:
  - if the job size for the print job is greater than the first threshold value, assigning the first autonomous cell to process the print job,
  - if the job size for the print job is less than a second threshold value, assigning the second autonomous cell to process the print job, and
  - otherwise, assigning the third autonomous cell to process the print job, and
- wherein the first threshold value is greater than the second threshold value.

16. The method of claim 15, further comprising:
selecting the second threshold value based on at least the job sizes for the plurality of jobs.

17. The method of claim 15 wherein selecting the first threshold value comprises dynamically updating the first threshold value substantially in real time.

18. A system for processing a plurality of print jobs in a transaction printing environment, the system comprising:
- a plurality of autonomous cells including a first autonomous cell, a second autonomous cell and a third autonomous cell, and wherein each of the plurality of autonomous cells is configured to process print jobs; and
- a print job workflow management system that coordinates a flow of print jobs with respect to said plurality of autonomous cells, wherein the print job workflow management system is configured to:
- receive a plurality of print jobs, wherein each print job has a job size,
- select a first threshold value based on at least the job sizes for the plurality of print jobs by simultaneously determining the first threshold value and a printer speed for the third autonomous cell by maximizing an objective function having at least a first constraint and a second constraint, wherein the first constraint comprises a maximum percentage of late jobs, wherein the second constraint comprises a minimum device utilization value, and
- for each print job, assign an autonomous cell to process the print job, wherein the first autonomous cell is assigned if the job size for the print job is greater than the first threshold value, wherein the second autonomous cell is assigned if the job size for the print job is less than a second threshold value, wherein the third autonomous cell is otherwise assigned,
- wherein the first threshold values is greater than the second threshold values.

19. The system of claim 18 wherein the print job workflow management system is further configured to select the second threshold value based on at least the job sizes for the plurality of print jobs.

20. The system of claim 18 wherein the print job workflow management system is configured to select a first threshold value by dynamically updating the first threshold value substantially in real time.

* * * * *